United States Patent Office 2,988,551
Patented June 13, 1961

2,988,551
PIPERAZINE DERIVATIVES
Henri Morren, Brussels, Belgium, assignor to Union Chimique Belge, S.A., Brussels, Belgium, a corporation of Belgium
No Drawing. Filed July 26, 1955, Ser. No. 524,615
Claims priority, application Belgium July 30, 1954
8 Claims. (Cl. 260—268)

The present invention relates to the preparation of compounds of the general formula

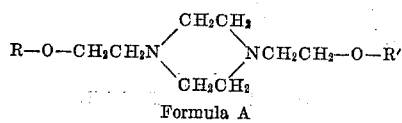

Formula A wherein R is a benzohydryl radical which may be substituted by a halogen atom, an alkoxy radical or an alkyl radical of not more than six carbon atoms; wherein R' is identical with R, or an alkyl of not more than eight carbon atoms, a hydroxyalkyl, cycloalkyl, phenyl or benzyl radical which may be substituted by a halogen atom or from 1 to 3 alkyl or alkoxy radicals.

These products have important biological properties especially in the field of allergy. Some of them counteract 800 to 1000 toxic histamine doses.

The process of preparing these compounds comprises reacting an alcoholate or a phenolate on a compound of the general formulae

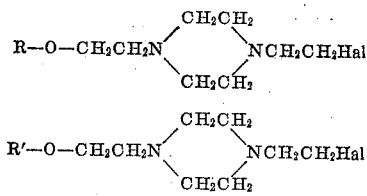

wherein R and R' have the aforesaid significance, and Hal denotes a halogen atom. These compounds are obtained from 1,4-bis-(2-hydroxyethyl)-piperazine by reacting the latter at first with a halide of R or R', and then with thionyl chloride.

The ethers described in this specification are all new.

The following examples specify the characteristics of these products.

EXAMPLE 1

*1 - (2 - p - chlorobenzohydryloxyethyl) - 4 - (2 - methoxyethyl) - piperazine and 1,4 - bis - (2 - p - chlorobenzohydryloxyethyl)-piperazine*

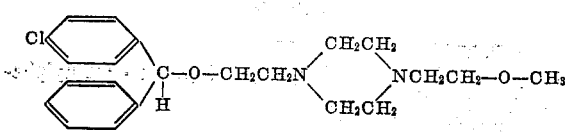

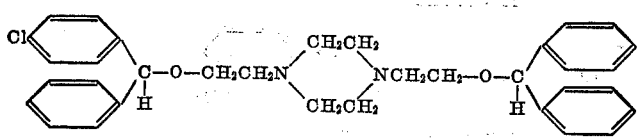

A mixture consisting of 0.1 mol of p-chlorobenzohydryl chloride and 0.2 mol of 1,4-bis-(2-hydroxyethyl)-piperazine is heated with mechanical stirring at 150° C. for 3 hours.

After cooling, the mass is treated with an aqueous solution of caustic soda, and extracted with benzene. The benzene solution is evaporated, and by distillation there is obtained at first 0.071 mol of 1-(2-p-chlorobenzohydryloxyethyl)-4-(2-hydroxyethyl)-piperazine, boiling at 217° C./0.05 mm. Hg, and then 0.01 mol of 1,4-bis-(2-p-chlorobenzohydryloxyethyl)-piperazine, boiling at 290° C./0.05 mm. Hg.

0.1 mol of 1-(2-p-chlorobenzohydryloxyethyl)-4-(2-hydroxyethyl)-piperazine is dissolved in 100 ml. of benzene, and this solution is treated in the cold with 0.11 mol of thionyl chloride. The mixture is then heated on the water bath until the liberation of sulphurous anhydride is finished. The hydrochloride of 1-(2-p-chlorobenzohydryloxyethyl)-4-(2-chlorethyl)-piperazine crystallizes on cooling. The solvent is evaporated, and the residue is taken up with anhydrous acetone, and filtered off. 0.08 mol of the pure product is thus obtained.

The corresponding base is liberated by dissolving the hydrochloride in water. The solution is rendered alkaline with potassium carbonate, and extracted with benzene. The benzene solution is dehydrated with potassium carbonate. The dehydrated solution is added to an equimolecular quantity of sodium methylate in methanolic solution. The whole is heated under reflux for 4 hours. It is evaporated to dryness, and then taken up with aqueous caustic soda solution and extracted with benzene. By distillation of the benzene solution, 1-(2-p-chlorobenzohydryloxyethyl)-4-(2-methoxyethyl)-piperazine, boiling at 199° C./0.02 mm. Hg, is obtained with 83 percent yield.

For preparing the di-hydrochloride, the base is dissolved in ethanol while passing a stream of gaseous hydrochloric acid through it. The salt is precipitated by an excess of ethyl ether. The dihydrochloride can be purified by dissolving in a small quantity of ethanol and reprecipitating with ethyl ether.

EXAMPLE 2

*1-(2-p-methoxybenzohydryloxyethyl)-4-(2-p-tert.-butylbenzyloxyethyl)-piperazine*

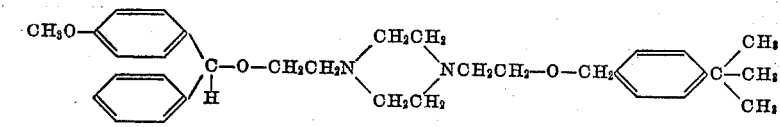

A mixture consisting of 0.4 mol of 1,4-bis-(2-hydroxyethyl)-piperazine and 0.2 mol of p-tert.-butylbenzyl bromide is heated to 180–190° C. for 3 hours. The mixture is then distilled off under high vacuum. 1-(2-hydroxyethyl)-4-(2-p-tert.-butylbenzyloxyethyl)-piperazine, boiling at 155–160° C./0.002 mm. Hg is obtained at first, and then 1,4-bis-(2-p-tert.-butylbenzyloxyethyl) - piperazine, boiling at 220° C./0.002 mm. Hg.

9.7 gm. of 1-(2-hydroxyethyl)-4-(2-p-tert.-butylbenzyloxyethyl)-piperazine are dissolved in 100 ml. of benzene. 4.1 gm. of cold thionyl chloride are added thereto. The mixture is then heated under reflux for 2 hours. After heating is stopped, the disengagement of sulphurous anhydride has completely ceased. The hydrochloride formed is isolated and heated with an aqueous solution of sodium bicarbonate, extracted with benzene, and the solution is treated with active carbon. It is dried and evaporated to dryness. Crude 1-(2-chloroethyl)-4-(2-p-tert.-butylbenzyloxyethyl)-piperazine is thus obtained. This product is added to the sodium derivative prepared from 21 gm. of p-methoxybenzohydrol and 0.7 gm. of metallic sodium in 75 ml. of toluene. The mixture is heated under reflux for 2 hours. The toluene is then evaporated and the product is heated to 150–160° C. for 3 hours.

After cooling, the product is treated with an aqueous alkaline solution, and extracted with benzene. By distillation there is obtained 1-(2-p-methoxybenzohydryloxyethyl)-4-(2-p-tert.-butylbenzyloxyethyl)-piperazine having a melting point of 260° C./0.002 mm. Hg.

EXAMPLE 3

*1-(2-p-n-hexylbenzohydryloxyethyl)-4-(2-cyclohexyloxyethyl)-piperazine*

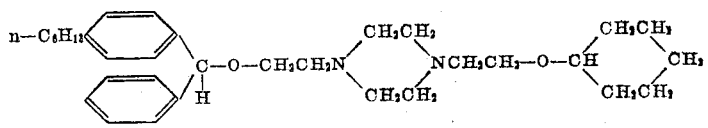

This compound, having a melting point of 255° C./0.005 mm. Hg is obtained according to the method described in Example 1 by reacting sodium cyclohexylate with 1-(2-p-n-hexylbenzohydryloxyethyl)-4-(2-chlorethyl)-piperazine.

This substance is prepared as follows:

Benzoyl chloride is caused to react upon n-hexylbenzene in the presence of aluminium chloride. In this way p-n-hexylbenzophenone is formed (B.P. 180° C./2 mm. Hg; M.P. of the dinitrophenylhydrazone (119° C.). This product is reduced (for example by zinc and ethanolic sodium hydroxide) and thus transformed into p-n-hexylbenzohydrol (B.P. 150° C./0.01 mm. Hg) which by treating with hydrochloric acid is converted into p-n-hexylbenzohydryl chloride. By reacting it with 1,4-bis-(2-hydroxyethyl)-piperazine there is obtained 1-(2-p-n-hexylbenzohydryloxyethyl)-4-(2 - hydroxyethyl) - piperazine having a melting point of 230–235° C./0.05 mm. Hg. This compound is converted by thionyl chloride into 1-(2-p-n-hexylbenzohydryloxyethyl)-4-(2-chlorethyl)-piperazine.

EXAMPLE 4

*Preparation of other 1,4-diethanol-piperazine derivatives*

By the process described in Example 1 there may be prepared the compounds corresponding to the following general formula:

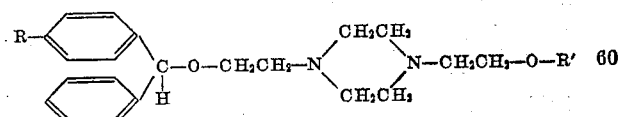

Formula B 1-(2-benzohydryloxyethyl)-4-(2 - tert. - butoxyethyl) - piperazine.
  Formula B, wherein
  R=H, and R'=—C≡(CH₃)₃
  B.P. 209° C./0.07 mm. Hg.
1-(2-benzohydryloxyethyl)-4-(2-n-hexyloxyethyl) - piperazine.
  Formula B, wherein
  R=H, and R'=—(CH₂)₅—CH₃
  B.P. 214° C./0.05 mm. Hg.
1-(2-benzohydryloxyethyl) - 4 - [2-(2'-ethylbutoxy) - ethyl]-piperazine.
  Formula B, wherein
  R=H, and R'=—CH₂CH=(C₂H₅)₂
  B.P. 220° C./0.05 mm. Hg.
1-(2-benzohydryloxyethyl)-4-(2-cyclohexyloxyethyl) - piperazine.
  Formula B wherein
  R=H and

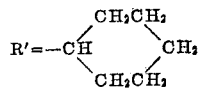

B.P. 245° C./0.05 mm. Hg.
1-(2-benzohydryloxyethyl)-4-[2-(4' - methoxycyclohexyloxy)-ethyl]-piperazine.
  Formula B wherein
  R=H and

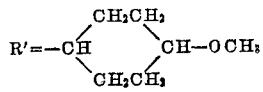

B.P. 243° C./0.02 mm. Hg.
1-(2-benzohydryloxyethyl)-4 - (2 - phenoxyethyl) - piperazine.
  Formula B wherein
  R=H and R'=C₆H₅
  B.P. 180–185° C./1.5 mm. Hg.
1,4-bis-(2-benzohydryloxyethyl)-piperazine.
  Formula B wherein
  R=H and

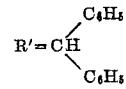

B.P. 250–255° C./0.01 mm. Hg.
1-(2-p-chlorobenzohydryloxyethyl) - 4-(2 - tert. - butoxyethyl)-piperazine.
  Formula B wherein
  R=Cl and R'=—C≡CH₃)₃
  B.P. 224° C./0.1 mm. Hg.
1-(2-p-chlorobenzohydryloxyethyl) - 4 - (2 - n - hexyloxyethyl)-piperazine.
  Formula B wherein
  R=Cl and R'=—(CH₂)₅CH₃
  B.P. 232° C./0.01 mm. Hg.
1-(2-p-chlorobenzohydryloxyethyl)-4-[2-(4' - methoxycyclohexyloxy)-ethyl]-piperazine.
  Formula B wherein
  R=Cl and

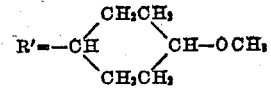

B.P. 270° C./0.04 mm. Hg.
1-(2-p-chlorobenzohydryloxyethyl)-4-(2 - m - methylphenoxyethyl)-piperazine.
  Formula B wherein
  R=Cl and

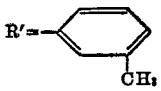

B.P. 235° C./0.05 mm. Hg.
1-(2-p-chlorobenzohydryloxyethyl) - 4-[2-2',6'-diisobutyl-4'-methylphenoxy)-ethyl]-piperazine.

Formula B wherein
R=Cl and

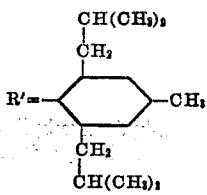

B.P. 248° C./0.4 mm. Hg.
1-(2-p-chlorobenzohydryloxyethyl)-4-(2-benzyloxyethyl)-piperazine.
Formula B wherein
R=Cl and

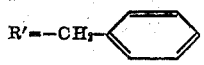

B.P. 220–230° C./0.07 mm. Hg.
1-(2-p-chlorobenzohydryloxyethyl)-4-(2-p - chlorobenzyloxyethyl)-piperazine.
Formula B wherein
R=Cl and

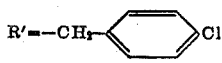

B.P. 260° C./0.3 mm. Hg.
1-(2-p - chlorobenzohydryloxyethyl) - 4 - (2 - m - methylbenzyloxyethyl)-piperazine.
Formula B wherein
R=Cl and

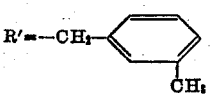

B.P. 250–260° C./0.005 mm. Hg.
1-(2-p-chlorobenzohydryloxyethyl)-4-(2- p-methylbenzyloxyethyl)-piperazine.
Formula B wherein
R=Cl and

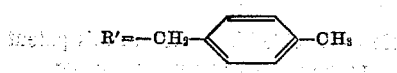

B.P. 245° C./0.01 mm. Hg.
1-(2-p-chlorobenzohydryloxyethyl)-4-[2-(3',5' - dimethylbenzyloxy)-ethyl]-piperazine.
Formula B wherein
R=Cl and

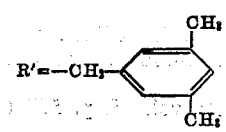

B.P. 265° C./0.05 mm. Hg.
1-(2-p-chlorobenzohydryloxyethyl) - 4 - (2 - p - n-butylbenzyloxyethyl)-piperazine.
Formula B wherein
R=Cl and

B.P. 280° C./0.05 mm. Hg.
1-(2-p-chlorobenzohydryloxyethyl)-4-(2 - p - tert. - butylbenzyloxyethyl)-piperazine.

Formula B wherein
R=Cl and

B.P. 270° C./0.05 mm. Hg.
1-(2-p-chlorobenzohydryloxyethyl) - 4 - (2 - p - methoxybenzyloxyethyl)-piperazine.
Formula B wherein
R=Cl and

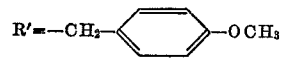

B.P. 260° C./0.01 mm. Hg.
1-(2-p-chlorobenzohydryloxyethyl)-4-(2-p-n - butoxybenzyloxyethyl)-piperazine.
Formula B wherein
R=Cl and

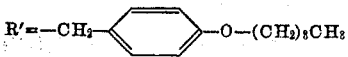

B.P. 282° C./0.1 mm. Hg.
1-(2-p-methylbenzohydryloxyethyl)-4-(2-p - methoxybenzyloxyethyl)=piperazine.
Formula B wherein
R=CH₃ and

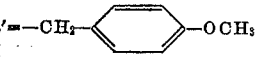

B.P. 235° C./0.1 mm. Hg.
1-(2-p-methoxybenzohydryloxyethyl)-4 - (2 - benzyloxyethyl)-piperazine.
Formula B wherein
R=OCH₃ and

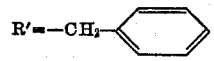

B.P. 248° C./0.01 mm. Hg.
1-(2-p-methoxybenzohydryloxyethyl) - 4 - (2 - m-methylbenzyloxyethyl)-piperazine.
Formula B wherein
R=OCH₃ and

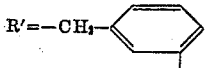

B.P. 260-270° C./0.01 mm. Hg.
1,4-bis-(2-p-methoxybenzohydryloxyethyl)-piperazine.
Formula B wherein
R=OCH₃ and

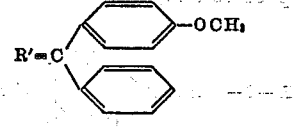

M.P. of the dihydrochloride 173° C. (recrystallised from acetone).
1-(2-p-chlorobenzohydryloxyethyl)-4 - (2 - n.octyloxyethyl)-piperazine.

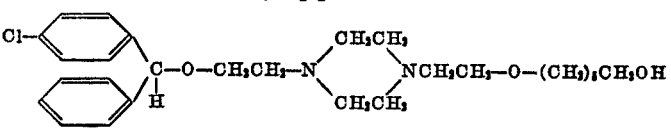

B.P. 245° C./0.03 mm. Hg.
1-(2-p-chlorobenzohydryloxyethyl)-4-[2-(6' - hydroxy-n.-hexyloxy)-ethyl]-piperazine.

B.P. 280° C./0.1 mm. Hg.

1-(2-p-chlorobenzohydryloxyethyl)-4-(2-cyclohexyloxyethyl)-piperazine.

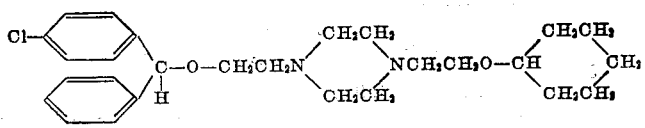

B.P. 238° C./0.05 mm. Hg.

1-(2-p-chlorobenzohydryloxyethyl)-4-[2-(4'-methylcyclohexyloxy)-ethyl]-piperazine.

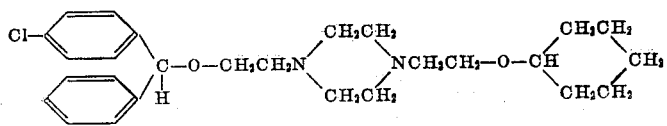

B.P. 244° C./0.05 mm. Hg.

The dihydrochloride of all the bases is obtained as described in Example 1.

I claim:

1. A process of preparing ethers of 1,4-diethanolpiperazine of the formula

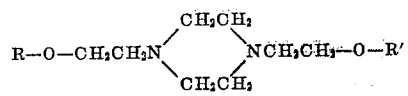

wherein R is a radical selected from the group consisting of benzhydryl, monochlorobenzhydryl, monoalkoxybenzhydryl and monoalkylbenzhydryl, the alkoxy and alkyl groups containing one to six carbon atoms, and wherein R' is a radical selected from the group consisting of 1 to 8 carbon alkyl, 1 to 8 carbon hydroxyalkyl, cyclohexyl, phenyl, benzyl, and substituted cyclohexyl, phenyl and benzyl wherein the substituent is selected from the group consisting of a chlorine atom, 1 to 3 alkyl radicals, and 1 to 3 alkoxy radicals, said process comprising the step of reacting a compound selected from the group consisting of the alcoholates and phenolates of the formula R'—O—Na with a compound of the formula

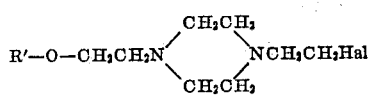

wherein Hal is a halogen atom selected from the group consisting of the chlorine atom and the bromine atom.

2. A process as defined in claim 1, further comprising the step of forming the compound of the formula

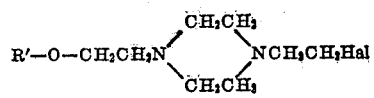

by reacting 1,4-bis-(2-hydroxyethyl)-piperazine with R' Hal and treating the reaction product with thionyl chloride.

3. A compound selected from the group consisting of the ethers of 1,4-diethanol-piperazine having the formula

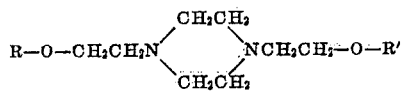

wherein R is a radical selected from the group consisting of benzhydryl, monochlorobenzhydryl, monoalkoxybenzhydryl and monoalkylbenzhydryl, the alkoxy and alkyl groups containing one to six carbon atoms, and wherein R' is a radical selected from the group consisting of 1 to 8 carbon alkyl, 1 to 8 carbon hydroxyalkyl, cyclohexyl, phenyl, benzyl, and substituted cyclohexyl, phenyl and benzyl wherein the substituent is selected from the group consisting of a chlorine atom, 1 to 3 alkyl radicals, and 1 to 3 alkoxy radicals, and the dihydrochlorides thereof.

4. 1-(2-p-chlorobenzhydryloxyethyl)-4-(2-tert-butoxyethyl)-piperazine.

5. 1-(2-p-chlorobenzhydryloxyethyl)-4-(2-n-hexyloxyethyl)-piperazine.

6. 1-(2-p-chlorobenzhydryloxyethyl)-4-[2-(4'-methylcyclohexyloxy)-ethyl]-piperazine.

7. 1-(2-p-chlorobenzhydryloxyethyl)-4-(2-p-methoxybenzyloxyethyl)-piperazine.

8. 1-(2-p-chlorobenzhydryloxyethyl)-4-[2-(3,5-dimethylbenzyloxy)-ethyl]-piperazine.

References Cited in the file of this patent

UNITED STATES PATENTS

| | | |
|---|---|---|
| 2,527,962 | Rieveschl | Oct. 31, 1950 |
| 2,527,963 | Rieveschl | Oct. 31, 1950 |

OTHER REFERENCES

Ratner: Allergy, Anaphylaxis and Immunotherapy, page 382 (1943).

Fieser and Fieser: 2nd edition, p. 137 (1950).

Hazard et al.: Arch. Inter. Pharmacodynamie, 84, 237–256 (1950).

Chem. Abstracts, vol. 45, p. 577 (1951).